US009338116B2

(12) United States Patent
Langlois

(10) Patent No.: US 9,338,116 B2
(45) Date of Patent: May 10, 2016

(54) DEVICE AND METHOD FOR DISPLAYING AND INTERACTING WITH DISPLAY OBJECTS

(71) Applicant: BlackBerry Limited, Waterloo (CA)

(72) Inventor: Michael George Langlois, Almonte (CA)

(73) Assignee: BlackBerry Limited, Waterloo (CA)

( * ) Notice: Subject to any disclaimer, the term of this patent is extended or adjusted under 35 U.S.C. 154(b) by 312 days.

(21) Appl. No.: 13/930,219

(22) Filed: Jun. 28, 2013

(65) Prior Publication Data
US 2015/0007049 A1 Jan. 1, 2015

(51) Int. Cl.
| G06F 3/00 | (2006.01) |
| G06F 3/048 | (2013.01) |
| G06F 3/033 | (2013.01) |
| H04L 12/58 | (2006.01) |
| G06F 3/01 | (2006.01) |
| G06F 3/0481 | (2013.01) |
| H04L 12/18 | (2006.01) |

(52) U.S. Cl.
CPC .............. *H04L 51/24* (2013.01); *G06F 3/017* (2013.01); *G06F 3/0481* (2013.01); *H04L 12/1895* (2013.01)

(58) Field of Classification Search
None
See application file for complete search history.

(56) References Cited

U.S. PATENT DOCUMENTS

| 5,565,888 | A | * | 10/1996 | Selker ................ G06F 3/04895 345/157 |
| 7,996,045 | B1 | | 8/2011 | Bauer et al. |
| 2010/0332581 | A1 | * | 12/2010 | Mills et al. .................... 709/202 |
| 2011/0260970 | A1 | | 10/2011 | Kuo et al. |
| 2012/0102400 | A1 | | 4/2012 | Worley et al. |
| 2014/0101600 | A1 | * | 4/2014 | Macbeth et al. ............. 715/780 |
| 2014/0101780 | A1 | * | 4/2014 | Zuber ............................ 726/28 |
| 2014/0282233 | A1 | * | 9/2014 | Sandler et al. ............... 715/800 |
| 2014/0365886 | A1 | * | 12/2014 | Koenig et al. ................ 715/711 |

FOREIGN PATENT DOCUMENTS

WO 2009097555 A2 8/2009

OTHER PUBLICATIONS

European Search Report for corresponding EP application No. 13174438.5 dated Dec. 5, 2013.

* cited by examiner

Primary Examiner — Stephen Alvesteffer
(74) Attorney, Agent, or Firm — Moffat & Co.

(57) ABSTRACT

A method and a device are disclosed, whereby notifications displayed on a display can be interacted with. In particular, a notification is displayed on a display, the notification initially being in an initial notification state. User input is detected and it is determined if the user input is being made in a direction towards the notification. If the user input is being made in a direction towards the notification, the notification is placed into a subsequent notification state.

44 Claims, 7 Drawing Sheets

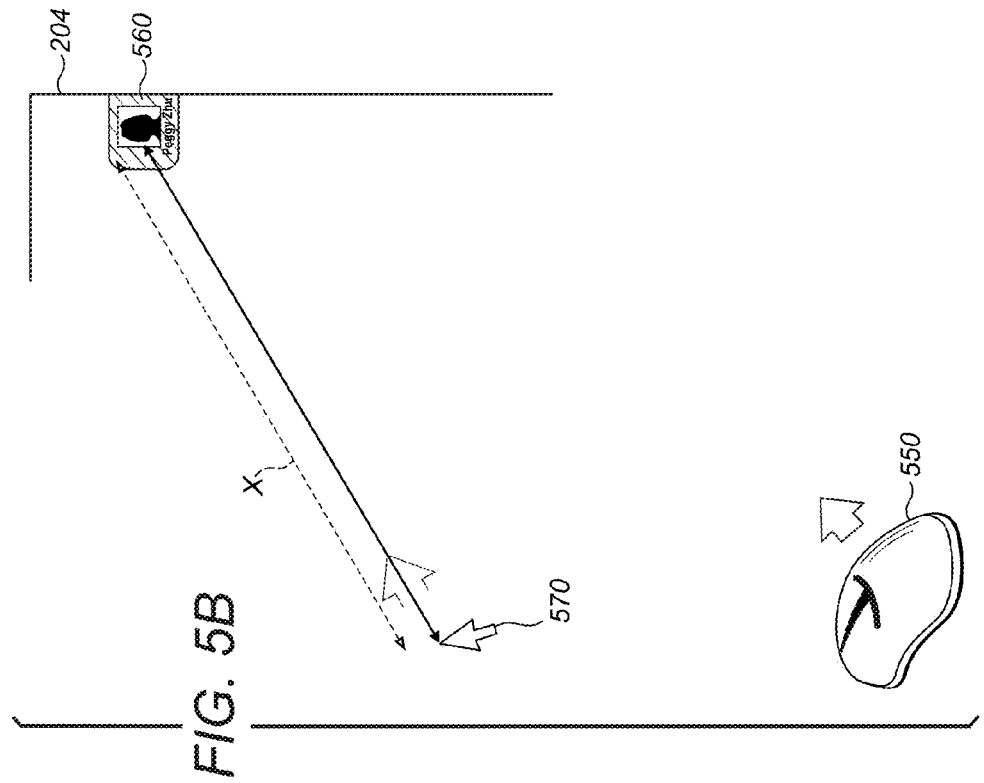
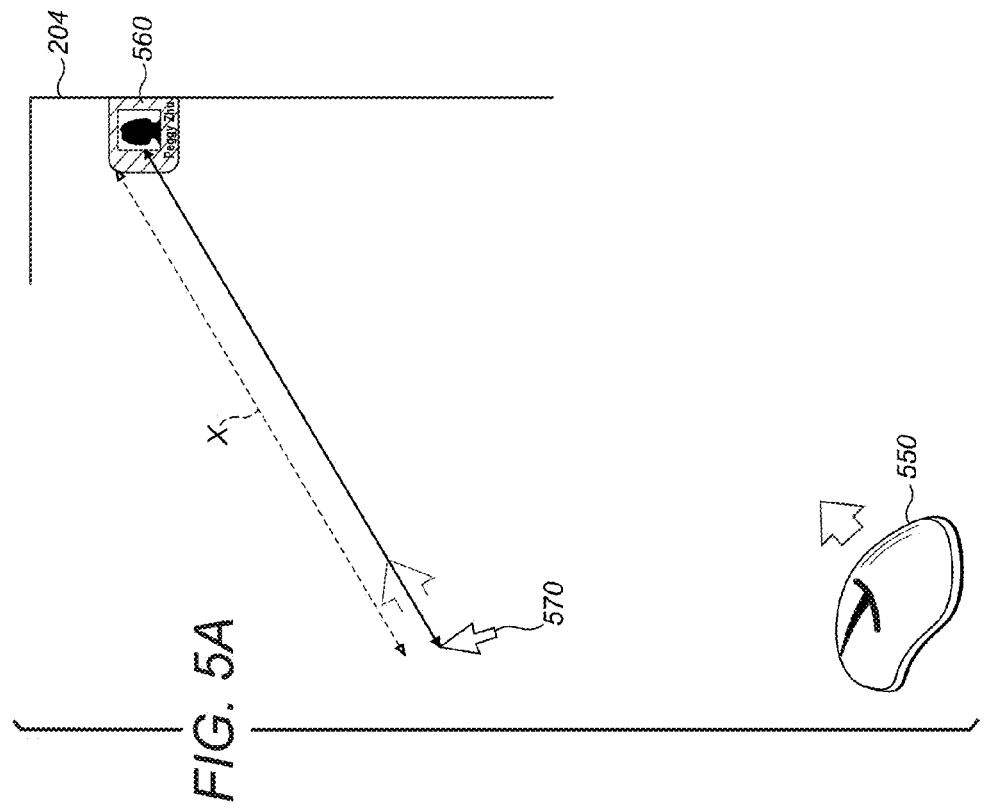

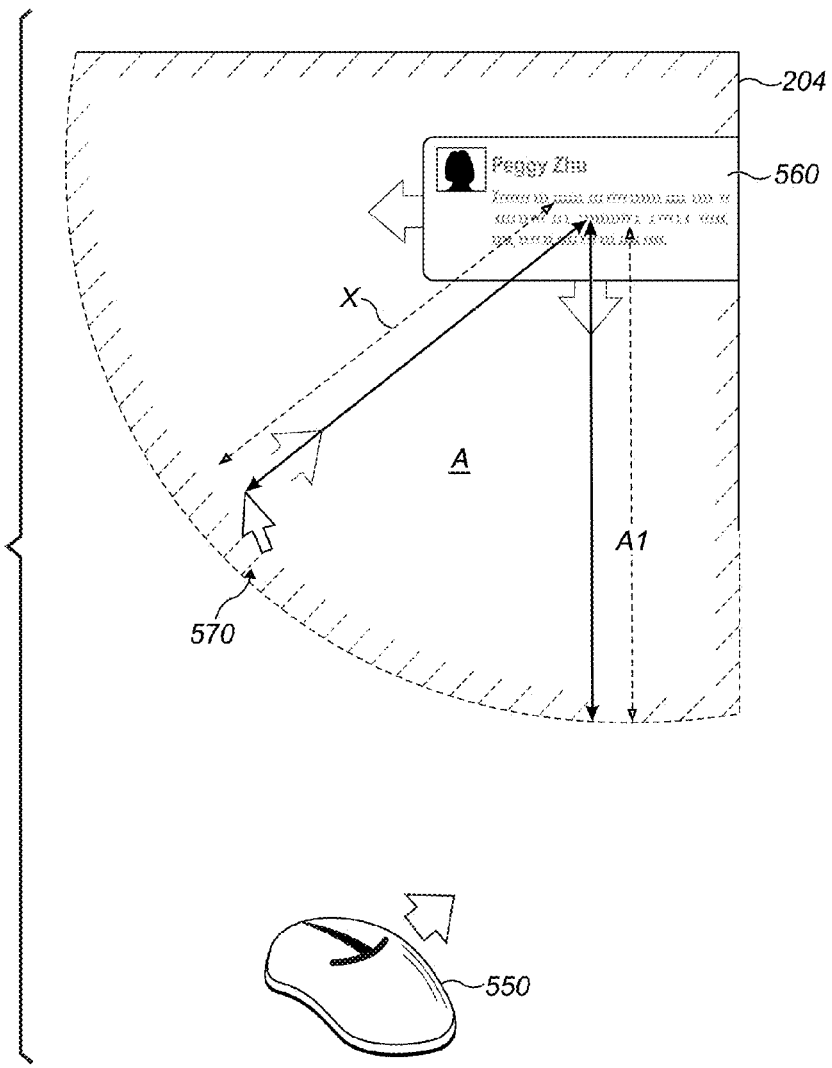

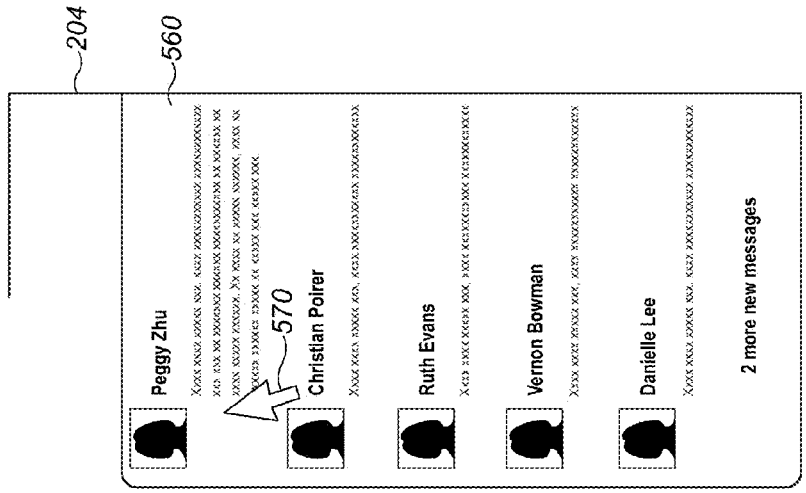
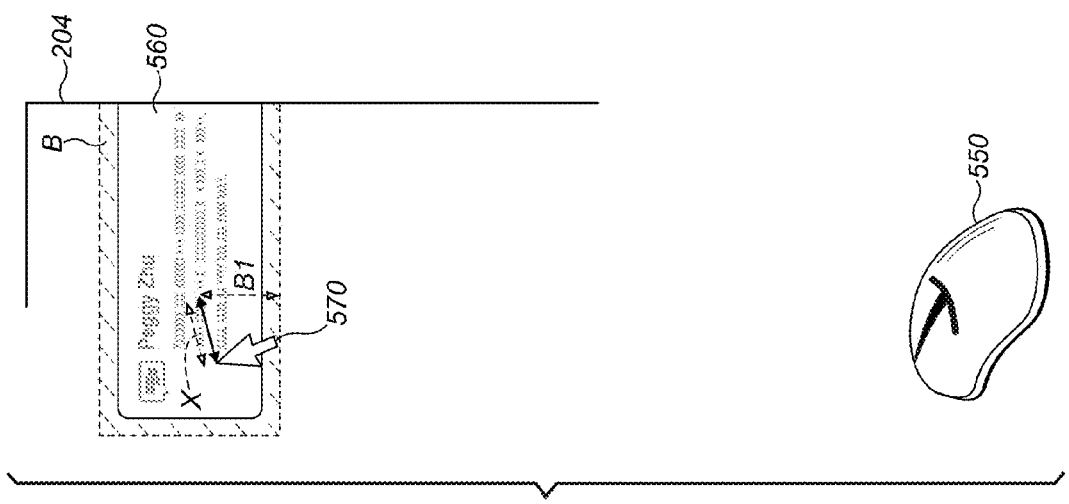

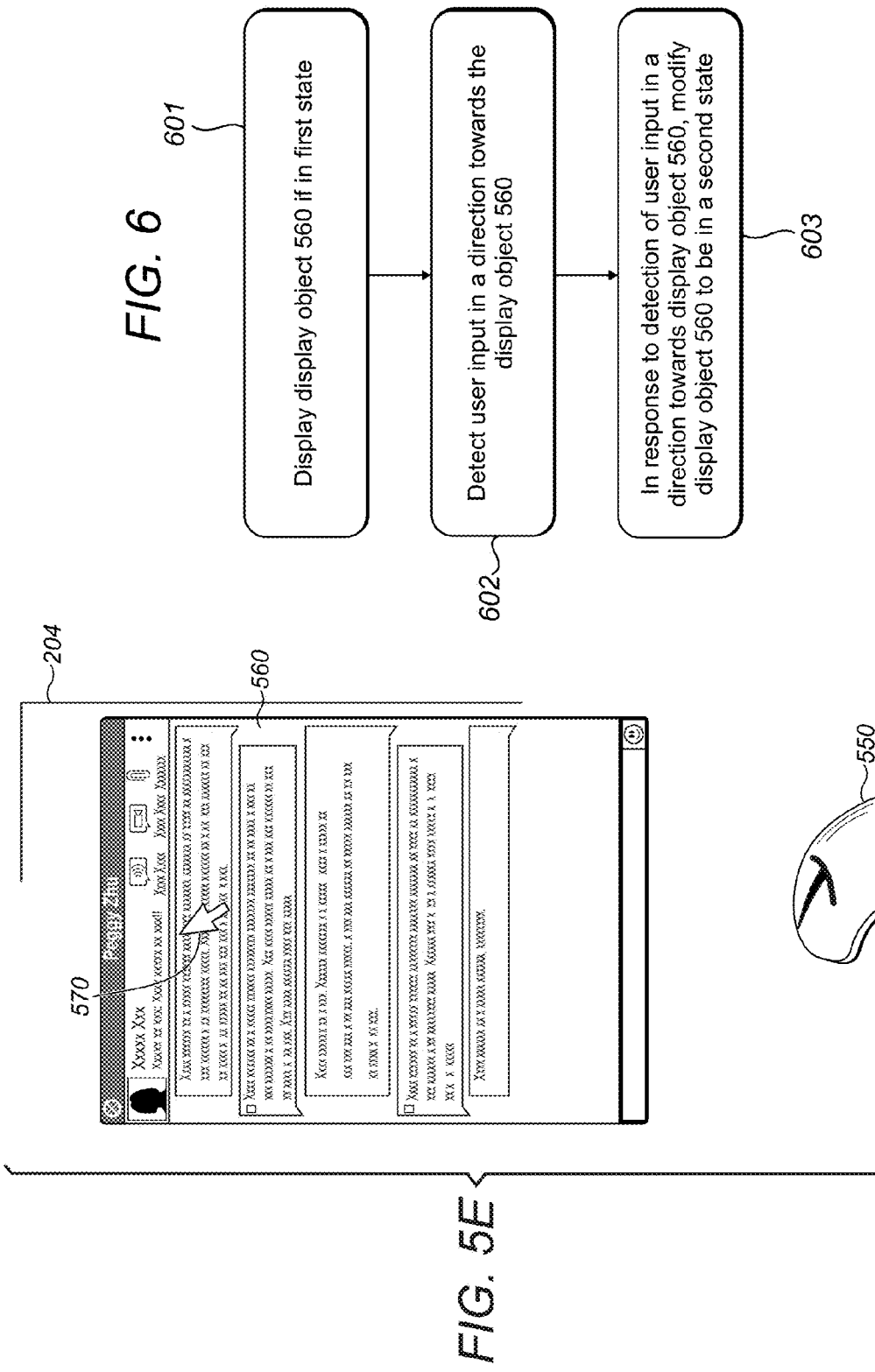

DEVICE AND METHOD FOR DISPLAYING AND INTERACTING WITH DISPLAY OBJECTS

TECHNICAL FIELD

The present disclosure relates to a device and a method for displaying and interacting with display objects, such as notifications, displayed on a display.

BACKGROUND

Electronic devices are able to display objects, e.g. notifications, on their displays. For example when an incoming message, such as an email, Short Message Service (SMS) message, or other electronic message, is received or detected by an electronic device, the notification may appear in a particular form providing particular information about the message. The notification may be of a particular size and it may appear in one part or area of the device's display and may be displayed only for a predefined period of time so that the notification disappears or fades from the display after the predefined period of time has expired.

BRIEF DESCRIPTION OF THE DRAWINGS

The present disclosure can be understood with reference to the description of the embodiments set out below, in conjunction with the appended drawings in which:

FIGS. 5A, 5B, 5C, 5D(i) and 5D(ii) to 5E are representations of various configurations of a display which can be generated by the electronic device in some embodiments; and FIG. 6 is a flow chart depicting a method performed by a processor of the electronic device in some embodiments.

DESCRIPTION

Figure 1:
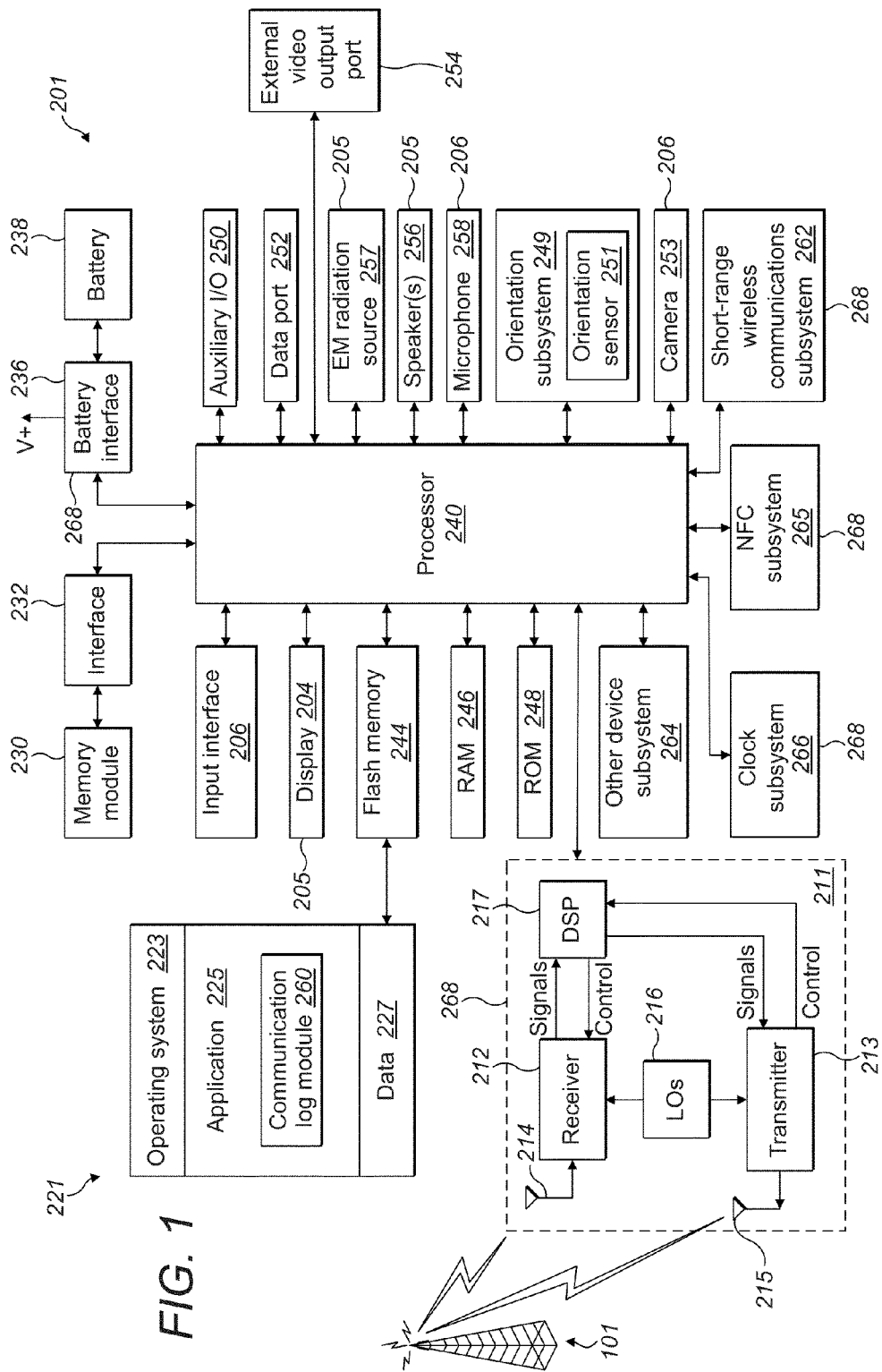
FIG. 1 is a schematic diagram illustrating components of an electronic device usable by a user according to the present disclosure.

This disclosure below is a description of one or more exemplary embodiments which are not intended to be limiting on the scope of the appended claims.

In a first aspect, there is provided a method for interacting with a notification displayed on a display, comprising: displaying a notification on a display, the notification initially being in an initial notification state; detecting user input and determining if the user input is being made in a direction towards the notification; and if the user input is being made in a direction towards the notification, placing the notification into a subsequent notification state. The notification may be a display object, in which case the display object may equate to the notification, consist entirely of the notification or comprise or include the notification.

The initial notification state may be an operating state, e.g. of a processor implementing the steps of the method, or an operating state of the display, in which user input is detectable and it is determined if the user input is being made in a direction towards the notification; and if the user input is being made in a direction towards the notification, the notification is then placed into a subsequent notification state by virtue of it being in the initial notification state. In general, the notification states mentioned below may be operating states of a processor implementing the steps of the method, and/or operating states of the display.

The method may further comprise detecting an event, wherein the step of displaying the notification takes place in response to detection of the event.

The event may be one or more of: receipt of an electronic communication, such as an electronic message or call; notification of an alarm; and upcoming event notification.

The initial notification state may be a first notification state such that the notification is displayed on the display only for a first time period from when it was initially displayed.

In the first notification state, the notification may be displayed on the display for only the first time period, and on expiry of the first time period, the notification may disappear from the display entirely or appear in reduced form on the display. The first time period may be a maximum time period for which the notification is displayed, before it is removed from the display completely.

The subsequent notification state may be a second notification state such that the notification is displayed on the display for a second time period from when the notification was placed in the second notification state. The subsequent notification state may be an operating state of a processor implementing the method, or of the display, whereby by virtue of the processor or display being in such an operating state cause the notification to be displayed on the display for a second time period from when the notification was placed in the second notification state.

In the second notification state, the notification may be displayed on the display for only the second time period, and on expiry of the second time period, the notification may disappear from the display entirely or appear in reduced form on the display. The second time period may be a maximum time period for which the notification is displayed, before it is removed from the display completely.

The second time period may be infinite. The first time period may be equal to the second time period, or may be less or more than the first time period.

The first notification state may be such that the notification is removed from the display by expiry of the first time period.

Optionally, when the notification is in the first notification state, it may be displayed in such a way that it fades over time, and wherein when the notification enters into the subsequent notification state, the notification becomes unfaded. In the subsequent notification state, the notification may become less faded if user input continues in a direction towards the notification.

The user input may be received via an input interface which provides a current input position on the display. The step of determining if the user input is being made in a direction towards the notification may comprise determining the current input position on the display and comparing it with a previously received current input position.

The method may further comprise determining if the current input position is within a first predefined loci of input positions, and, if so, placing the notification in the subsequent notification state which may be a third notification state, wherein the third notification state is such that the notification is displayed in the display with additional display elements to those displayed within the notification when the notification is in its initial notification state. The third notification state may be the subsequent notification state, and, for example, be a state which immediately follows the initial notification state.

The notification may be displayed in an expanded form in the display when in its third notification state with respect to the display of the notification when in its first notification state. The first predefined loci of input positions may be defined by input positions which are all within a predefined distance from the notification.

The first predefined loci of input positions may not include input positions at locations in the display where the notification is being displayed. The first predefined loci of input positions may be defined by input positions which overlap with locations in the display where the notification is being displayed.

The notification may be placed only its third notification state when additionally an input signal from the input interface is detected.

Optionally, if the current input position is within a second predefined loci of input positions, then the method may comprise placing the notification in a fourth notification state, wherein the fourth notification state is such that the notification is displayed in the display with additional display elements to those displayed within the notification when the notification is in its third notification state. Optionally, the fourth notification state may be the subsequent notification state, and, for example, be a state which immediately follows the initial notification state.

The second predefined loci of input positions may be defined by input positions which overlap with locations in the display where the notification is being displayed.

The notification may be placed only its fourth notification state when additionally an input signal from the input interface is detected.

The additional display elements may comprise one or more of: a message reply entry field; a message preview; a message body; a message sent or received time and/or date; a message reply control element; a message forward control element; a message delete control element; some or all preceding messages in a conversation; information or indications of some or all preceding messages in a conversation or from a given sender; information or an indications of unread messages, such as all unread messages; information or an indications of new messages, such as all new messages, e.g. new messages received since the notification was previously displayed according to the fourth notification state; a calendar entry preview; a calendar entry body; a calendar entry accept control element; a calendar entry reject control element; and a calendar entry tentative control element; a calendar entry location field; and a calendar entry date and/or time.

The notification may be displayed in its initial notification state as a notification comprising one or more of: a message sender name; a message sender image; a message subject; a message preview; information or indications of some or all preceding messages in a conversation or from a given sender; information or an indications of unread messages, such as all unread messages; information or an indications of new messages, such as all new messages, e.g. new messages received since the notification was previously display; a calendar entry sender; a calendar entry sender image; a calendar entry preview; a calendar entry subject; a calendar entry date and/or time; and a calendar entry location field.

The subsequent notification state may be a state in which the size of the notification is expanded (e.g. increased in area) as the user input is made in a direction towards the notification. In the expanded state, the additional information mentioned above may be displayed.

The size (e.g. area) of the notification may be decreased as user input is made in a direction away from the notification, following a preceding expansion in the size of the notification.

The amount of decrease in size (e.g. area) of the notification may correspond to the amount or magnitude of user input which is in a direction away from the notification.

The amount of expansion in size (e.g. area) of the notification may correspond to the amount or magnitude of user input which is in a direction towards the notification.

In a second aspect, an electronic device comprises processing circuitry and a display, wherein the processing circuitry is configured to perform the method mentioned above.

In a third aspect, an electronic device, comprising: a display configured to display a notification, the notification initially being in an initial notification state; an input interface configured to detect user input; and processing circuitry configured to determine if the user input is being made in a direction towards the notification, and, if the user input is being made in a direction towards the notification, place the notification into a subsequent notification state.

The initial notification state may be an operating state, e.g. of the processing circuitry or of the display, in which user input is detectable and in which it can be determined if the user input is being made in a direction towards the notification; and if the user input is being made in a direction towards the notification, the notification is then placed into the subsequent notification state by virtue of it being in the initial notification state. In general, the notification states mentioned below may be operating states of the processing circuitry implementing the steps of the method, and/or operating states of the display.

The processing circuitry may be connected to and configured to control the display to display the notification in accordance with the embodiments disclosed herein.

The processing circuitry may be configured to detect an event, wherein displaying the notification may take place in response to detection of the event.

The event may be one or more of: receipt of an electronic communication, such as an electronic message or call; notification of an alarm; and upcoming event notification.

The initial notification state may be a first notification state such that the notification is displayed on the display only for a first time period from when it was initially displayed. In the first notification state, the notification may be displayed on the display for only the first time period, and on expiry of the first time period, the notification may disappear from the display entirely or appear in reduced form on the display. The first time period may be a maximum time period for which the notification is displayed, before it is removed from the display completely.

The subsequent notification state may be a second notification state such that the notification is displayed on the display for a second time period from when the notification was placed in the second notification state. In the second notification state, the notification may be displayed on the display for only the second time period, and on expiry of the second time period, the notification may disappear from the display entirely or appear in reduced form on the display. The second time period may be a maximum time period for which the notification is displayed, before it is removed from the display completely.

The second time period may be infinite. The first time period may be equal to the second time period.

The first notification state may be such that the notification is removed from the display by expiry of the first time period.

Optionally, when the notification is in the first notification state, it is displayed in such a way that it fades over time, and wherein when the notification enters into the subsequent notification state, the notification becomes unfaded. Optionally in the subsequent notification state, the notification may become less faded if user input continues in a direction towards the notification. "Faded" may mean one or more of: opaqueness of the notification increases; less information is displayed within the notification; and colour of the notification changes so that the notification is less dominant on the display with respect to other objects being displayed.

The user input may be received via an input interface which provides a current input position on the display.

The step of determining if the user input is being made in a direction towards the notification may comprise determining the current input position on the display and comparing it with a previously received current input position. The step of determining may comprise determining if there is any component of movement in a direction towards the notification having a positive magnitude. The direction towards the notification may mean a direction in a straight line direction from the current input position (e.g. pointer position) to any point on the border of the notification, or a centre point of the notification, or other predefined point within or on the notification. A positive magnitude of such a component may indicate movement towards the notification. A negative magnitude of such a component may indicate movement away from the notification.

The processing circuitry may be configured to determine if the current input position is within a first predefined loci of input positions, and, if so, place the notification in the subsequent notification state which is a third notification state, wherein the third notification state is such that the notification is displayed in the display with additional display elements to those displayed within the notification when the notification is in its initial notification state.

The notification may be displayed in an expanded form in the display when in its third notification state with respect to the display of the notification when in its first notification state.

The first predefined loci of input positions may be defined by input positions which are all within a predefined distance from the notification. The predefined distance may mean a distance in a straight line direction from the current input position (e.g. pointer position) to any point on the border of the notification, or a centre point of the notification, or other predefined point within or on the notification.

The first predefined loci of input positions may not include input positions at locations in the display where the notification is being displayed. The first predefined loci of input positions may be defined by input positions which overlap with locations in the display where the notification is being displayed. The notification may be placed only its third notification state when additionally an input signal from the input interface is detected.

The processing circuitry may be configured to determine if the current input position is within a second predefined loci of input positions, and, if so, place the notification in a fourth notification state, wherein the fourth notification state is such that the notification is displayed in the display with additional display elements to those displayed within the notification when the notification is in its third notification state.

The second predefined loci of input positions may be defined by input positions which overlap with locations in the display where the notification is being displayed. The notification may be placed only its fourth notification state when additionally an input signal from the input interface is detected by the processing circuitry. The input signal may be generated in response to one or more button presses on a input device, e.g. mouse, track pad etc., or be in response to a predefined gesture on a touch interface, such as one or more taps or swipe gestures.

The additional display elements may comprise one or more of: a message reply entry field; a message preview; a message body; a message sent or received time and/or date; a message reply control element; a message forward control element; a message delete control element; information or indications of some or all preceding messages in a conversation or from a given sender; information or an indications of unread messages, such as all unread messages; information or an indications of new messages, such as all new messages; a calendar entry preview; a calendar entry body; a calendar entry accept control element; a calendar entry reject control element; and a calendar entry tentative control element; a calendar entry location field; and a calendar entry date and/or time.

The notification may be displayed in its initial notification state as a notification comprising one or more of: a message sender name; a message sender image; a message subject; information or indications of some or all preceding messages in a conversation or from a given sender; information or an indications of unread messages, such as all unread messages; information or an indications of new messages, such as all new messages; a message preview; a calendar entry sender; a calendar entry sender image; a calendar entry preview; a calendar entry subject; a calendar entry date and/or time; and a calendar entry location field.

A conversation may be defined as a chain of all messages relating to a subject of the messages, group of recipients, recipient and/or sender, and/or other common identifying characteristic or data of a plurality of messages which form the conversation.

The subsequent notification state may be a state in which the size of the notification may be expanded (e.g. increased in area) as the user input is made in a direction towards the notification. The size (e.g. area) of the notification may be decreased as user input is made in a direction away from the notification, following a preceding expansion in the size of the notification. The amount of decrease in size (e.g. area) of the notification may correspond to the amount or magnitude of user input which is away from the notification. The amount of expansion or increase in size of the notification may correspond to the amount or magnitude of user input which is in a direction towards the notification.

In a fourth aspect, there may be a computer readable medium comprising computer executable instructions which, when executed by processing circuitry, cause the processing circuitry to perform the above method.

In a fifth aspect, there is provided a computer readable medium comprising computer executable instructions which, when executed by processing circuitry, cause the processing circuitry to display a notification on a display, the notification initially being in an initial notification state; detect user input and determine if the user input is being made in a direction towards the notification; and if the user input is being made in a direction towards the notification, place the notification into a subsequent notification state.

The electronic device may be a computer device, such as a personal computer, laptop, tablet computer, and the second electronic device may be a wireless communication device, such as handheld communication device, for example: a mobile phone, e.g. smartphone; or tablet device.

Reference is made to FIG. 1 which illustrates an electronic device 201, such as a first and/or second electronic device, which is usable in accordance with the disclosure below.

The electronic device 201 may be a computer device, e.g. personal computer (PC) or laptop, a wireless communication device, such as handheld communication device, for example: a mobile phone, e.g. smartphone; or tablet device.

An electronic device 201 such as the electronic device 201 of FIG. 1 is configured to generate a user-controllable interface on a display, such as a built-in display and/or on a remote, external display device. In the context of this disclosure, the term "remote" means a display screen which is not built-in to the electronic device 201 with which the electronic device 201 communicates via a physical wired connection or via a wireless connection. The display is shown as display 204 built in to the electronic device 201 in FIG. 2 in which the electronic device 201 is a wireless communication device, and is also shown as external display device 300 in FIG. 3 in which the display 204 is separate to the electronic device 201.

It will be appreciated that, in certain embodiments, some of the features, systems or subsystems of the electronic device 201 discussed below with reference to FIG. 1 may be omitted from electronic devices 201 which are intended to perform solely operations in relation to the generation and output of display data on the display and the modification of media content output. However, a full disclosure of a number of features which may be present in the electronic device 201 is given below.

In one embodiment, the electronic device 201 is a computer, such as a personal computer (PC) or laptop, with electronic communication capabilities which enable it to communicate with other electronic devices (e.g. similar or identical to electronic device 201), networks and/or servers. In this regard, communication may be direct between devices or may take place over a network, such as the Internet. In both cases, communication may take place via as a short-range radio frequency link, e.g. Bluetooth, or via a data network, which may be wired (e.g. wired Ethernet) or may be wireless (e.g., WiFi using IEEE 802.11 radio standards).

In another embodiment, the electronic device 201 is a communication device, such as a wireless communication device, and may be a mobile or handheld device, such as a mobile or handheld communication device, for example having data and/or voice communication capabilities. It may also have the capability to communicate with other electronic devices (similar or identical to electronic device 201). In this regard, communication may be direct between the devices or may take place over a data network, such as the Internet. In both cases, communication may take place via as a short-range radio frequency link, e.g. Bluetooth, or via a data network, which may be wired (e.g. wired Ethernet) or may be wireless (e.g., WiFi using IEEE 802.11 radio standards).

Depending on the functionality provided by the electronic device 201, the electronic device 201 may be a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. It will be appreciated that the electronic device 201 may take other forms, including any one of the forms described herein. In addition, the electronic device 201 may take other forms apart from those specifically listed above. The electronic device 201 may also be referred to as a mobile, handheld or portable communications device, a communication device, a mobile device and, in some cases, as a device. In the context of this disclosure, the term "mobile" may mean that the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes processing circuitry being, or including, a processor 240 (such as a microprocessor), which can control the operation of the electronic device 201. In certain electronic devices, more than one processor is provided forming the processing circuitry, with each processor in communication with each other and configured to perform operations in parallel, so that they together control the overall operation of the electronic device. For the purposes of the present disclosure, reference is made to processor 240; however this can also be intended as a reference to processing circuitry, for example in which more than one processor performs the disclosed function or functions.

The processor 240 interacts with device subsystems, such as a communication subsystem 211, which may be wired or wireless, but which is shown in FIG. 1 in exemplary form as a wireless communication subsystem for exchanging radio frequency signals via a wireless network 101 to perform communication functions. The processor 240 is communicably coupled with additional device subsystems including one or more output interfaces 205 (such as one or more of: a display 204 (built-in, or remote), a speaker 256, electromagnetic (EM) radiation source 257), one or more input interfaces 206 (such as one or more of: a camera 253, microphone 258, keyboard (not shown), control buttons (not shown), a navigational input device (not shown), such as a pointer device, e.g. mouse, a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one embodiment is the flash memory 244. In various embodiments, the data 227 includes service data including information used by the electronic device 201 to establish and maintain communication with the wireless network 101. The data 227 may also include user application data such as electronic messages (e.g. email, SMS etc.), address book and contact information, calendar and schedule information, notepad documents, presentation documents and information, word processor documents and information, spreadsheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as a message application (e.g. email, SMS etc.), an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, messages, such as email or SMS messages, contact records, and task items may be stored in individual databases within the device memory.

The electronic device 201 includes a clock subsystem or module 266 comprising a system clock configured to measure system time. In one embodiment, the system clock comprises its own alternate power source. The system clock provides an indicator of a current time value, the system time, represented as a year/month/day/hour/minute/second/milliseconds value. In other embodiments, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together may form a status report subsystem which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain embodiments, the external video output port 254 is integrated with the data port 252. The external video output port 254 may be configured to connect the electronic device 201 via a wired connection (e.g. video graphics array (VGA), digital visual interface (DVI) or high definition multimedia interface (HDMI)) to an external (or remote) display device 300 which is separate and remote from the electronic device 201 and its display 204. The processor 240 outputs external display data generated by the processor 240 via the external video output port 254, such that the external display device 300 can display application data from the memory module in a predetermined way on an external display screen of the external display device 300. The processor 240 may also communicate the external display data to the external display device 300 in a similar fashion over a wireless communications path. At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 300 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 300 and the display 204 are not wholly identical, although similar or identical individual items of content based on the application data may be displayed on both the external display device 300 and the display 204. Either one of the display 204 or external display device 300 may be optional. References made herein to data displayed by the display 204 are intended to include references to data displayed on the display of the external display device 300, and vice-a-versa, whether or not one or other of the display 204 or external display device 300 are present.

The electronic device 201 includes an input interface 206 (for example: a pointing device, such as a mouse, trackpad, trackball etc.; and/or touch-sensitive interface, such as an interface overlaid on display 204) in communication with the processor 240. The pointing device, if present, may be built-in to electronic device 201, e.g. as a trackpad or trackball, or may be connected to the device 201, including its processor 240 via one or more of: the data port 252, the communication subsystem 211, the auxiliary input/output (I/O) subsystems 250, and the short-range wireless communications subsystem 262. The touch-sensitive interface, if present, may be constructed using a touch-sensitive input surface which is connected to processor 240 an electronic controller and which overlays the display 204. The touch-sensitive input surface and the electronic controller provide a touch-sensitive input interface 206 and the processor 240 interacts with the touch-sensitive overlay via the electronic controller. The input interface 206 may control the position of a pointer displayed on the display 204. The input interface 206 generally provides positional information of current or intended user input on the display 204, e.g. the position of a touch input on the touch-sensitive surface, if present, or the position of the pointer, if present, on the display 204.

The processor 240 may be in communication with the memory and input interface 206 to detect user input via the input interface 206. The processor 240 can then generate or update display data comprising a display object, e.g. a pointer or notification, for display by the display device 204 in accordance with the user input. The processor 240 then outputs the display data for display on the display device 204. In an embodiment, the user input may comprise one or more gestures made across the touchscreen interface with input interface 206.

If the input interface 206 comprises the pointing device mentioned above, the input detected by the pointing device may comprise any suitable user-based input. For example, the input may comprise one or more inputs including, for example: a continuous movement of the pointing device to cause user input (e.g. of a pointer displayed on the display 204) to be in one or more particular directions across the display 204, the pressing of one or more buttons of the pointing device, a scrolling command input by the pointing device, and any other user input received with the pointing device. It will be appreciated that the input may comprise a sequence of input elements or stages performed with the pointing device within a specified or predetermined time frame, for example: a double press of a button on the pointing device in which each press comprises an element (or a sub-input, a phase or a stage) of the input and the button presses are performed within a time frame that enables the processor 240 to detect the presses as elements of a single input; or a number of discrete phases of continuous movement of the pointing device in different directions across the display 204 in which each movement comprises an element (or a sub-input, a phase or a stage) of the user input and the movement elements are performed within a time frame that enables the processor 240 to detect movements as a single input indicative of movement in a general direction across the display.

If the input interface 206 comprises the touch-sensitive surface mentioned above, the input detected by the touch-sensitive surface interface may comprise any suitable user touch-based input. For example, the input may comprise one or more gestures as an input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g., a finger or stylus, from the touchscreen interface.

Many examples described herein refer to a gesture detected by the touch-sensitive interface, but other methods of gesture detection may be used. For example, a gesture may be a generalized trajectory description characterized as a sequence of 3D points in time, and as such many different sensors of the electronic device 201 may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known. An accelerometer or gyroscope may be utilized to detect 3D spatial gestures. A sequence of acceleration values may be detected in the different spatial dimensions as a function of time and constitute trajectory information that can be recognized as a gesture. For example, a quick flick and a tilt of the portable electronic device are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input may be different to input of a command by manipulation of a control component presented on the screen because a gesture input can be performed at any location within the display screen (or a large area of the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific location on the screen. Instead, a user wishing to, e.g., scroll through a list of media content can do so by performing a swipe gesture at any location within a media-player display.

In at least some embodiments, the touch-sensitive surface has a touch-sensitive surface which is larger than the display 204. For example, in at least some embodiments, the touch-sensitive overlay may extend overtop of a frame (not shown) which surrounds the display 204. In such embodiments, the frame (not shown) may be referred to as an active frame since it is capable of acting as part of the input interface 206. In at least some embodiments, the touch-sensitive overlay may extend to the sides of the electronic device 201.

As noted above, in some embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the communication subsystem 211 depends on the wireless network 101 in which electronic device 201 is intended to operate.

In at least some embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (ND) conversion. ND conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for providing direct communication of data with and between the device 201, including, for example, its processor 240, and another electronic device, which may be similar or identical to electronic device 201.

In at least some embodiments, the electronic device 201 may also include a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer. The orientation sensor 251 may generate orientation data which specifies the orientation of the electronic device 201. The orientation data, in at least some embodiments, specifies the orientation of the device 201 relative to the gravitational field of the earth. Additionally or alternatively, the orientation sensor 251 may generate orientation data which specifies the orientation of the device relative to known locations or fixtures in a communication network. In some embodiments, the orientation subsystem 249 includes other orientation sensors 251, instead of or in addition to accelerometers. For example, in various embodiments, the orientation subsystem 249 may include a gravity sensor, a gyroscope, a tilt sensor, an electronic compass or other suitable sensor, or combinations thereof. In some embodiments, the device orientation subsystem 249 may include two or more orientation sensors 251 such as an accelerometer and an electronic compass. The orientation subsystem 249 may provide input to the input interface 206, such that, for example, three-dimensional gestures performed with the electronic device 201 as a whole may be detected and provide user input to the processor 240.

The electronic device 201, in at least some embodiments, may include a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 may include a microphone or one or more speakers. In at least some embodiments, an electronic device 201 includes a plurality of speakers 256. For example, in some embodiments, the electronic device 201 includes two or more speakers 256. The two or more speakers 256 may, for example, be disposed in spaced relation to one another. That is, in at least some embodiments, the electronic device 201 may include a first speaker and a second speaker and the first speaker and the second speaker may be spatially separated from one another within the electronic device 201. In at least some embodiments, the display 204 may be disposed between the first speaker and the second speaker of the electronic device. In such embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some embodiments, each speaker 256 may be associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such embodiments, the direction of capture of the camera is always predictable relative to the display 204 or the housing. In at least some embodiments, the camera may be provided in a central location relative to the display 204 to facilitate image acquisition of a face.

In at least some embodiments, the electronic device 201 includes an electromagnetic (EM) radiation source 257. In at least some embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

In some embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device

201 using the USB cable or Bluetooth® connection. Similarly, any traffic destined for the wireless network 101 may automatically be sent over the USB cable Bluetooth® connection to the host computer system for processing.

The electronic device 201 may also include a power source 238, which may be a wired power supply, such as mains supply, or battery, for example one or more rechargeable batteries that may be charged for example, through charging circuitry coupled to a battery interface 236 such as the data port 252. The power source 238 provides electrical power to at least some of the electrical circuitry in the electronic device 201, and the power interface 236 provides a mechanical and electrical connection for the power source 238. The power interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some embodiments, the short-range communication subsystem 262 is a wireless bus protocol compliant communication mechanism such as a Bluetooth® communication module to provide for communication with similarly-enabled systems and devices.

Any one or more of the communication subsystem 211, the auxiliary input/output (I/O) subsystems 250, the NFC subsystem 265, the short-range wireless communications subsystem 262, and data port 252 may serve as the "communication subsystem 211" (also designated as communication subsystem 268 in FIG. 1) for passing data to/from the processor 240 and remote devices (similar or identical to device 201) and/or communication networks. For example, these subsystems may be configured to receive, process and provide an indicator of an incoming message or communication being received by the electronic device 201. The incoming message may for example be an electronic message, such as an email, a message received via a social networking website, an SMS (short message service) message, or a telephone call, for example. Thus, reference herein to "communication subsystem 211" may in fact be a reference to any one or more of the communication subsystem 211, the auxiliary input/output (I/O) subsystems 250, the NFC subsystem 265, the short-range wireless communications subsystem 262, and data port 252, and thus data (including messages) received and transmitted by/from the processor 240 thereby.

The electronic device 201 may, in some embodiments, provide a data communication mode, and optionally a voice communication mode. In the data communication mode, a received data signal of an electronic message, such as a text message, an email message, or Web page download will be processed by the communication subsystem 211 and input to the processor 240 for further processing. For example, a downloaded Web page may be further processed by a browser application or an electronic message may be processed by an messaging application and the message or page itself, or notification of its arrival via the communication subsystem 211, may be output to the display 204. A user of the electronic device 201 can compose data items, such as electronic messages; for example, using the input devices in conjunction with the display 204. These composed items may be transmitted through the communication subsystem 211 over the wireless network 101.

In the voice communication mode, the electronic device 201 provides telephony functions and operates as a typical cellular or mobile phone. Received voice signals can be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 based on program application data stored in memory such as persistent memory; for example, in the flash memory 244. As illustrated in FIG. 1, the software modules 221 include operating system software 223 and other software applications 225.

The program application data is executable by the processor 240 to permit various functions to be performed with the electronic device 201, whereby, for example, the application data can be received, processed and the display 206 can then be adapted by the processor 240 to display the application data itself, or notifications or representations thereof. For example, application data, such as one or more electronic messages, may be received over the data network or short-range link at the communication subsystem 211 or data port 252 which passes this data to the processor 240. A program application, such as a message application which is being executed by the processor 240 may process the received data and generate a notification for display on the display 204. The notification may be generated by the processor 240 in the form of display data which is passed to the display 204 for causing or adapting the display of one or more notifications on the display 204. The processor 240 may cause the notification to be displayed for a predetermined time only, before the display of the notification is changed or the notification is removed from the display 204 partially or entirely. As will be explained in further detail below, the processor 240 may receive one or more signals from the input interface 206, and thereby control and/or adapt the display of the notification on the display 204. The processor 240 may cause the notification to be displayed, adapted or removed based on one or more operating states of one or more program applications which are being executed by the processor 240, not necessarily the receipt of data via the communication subsystem 211.

Figure 2:
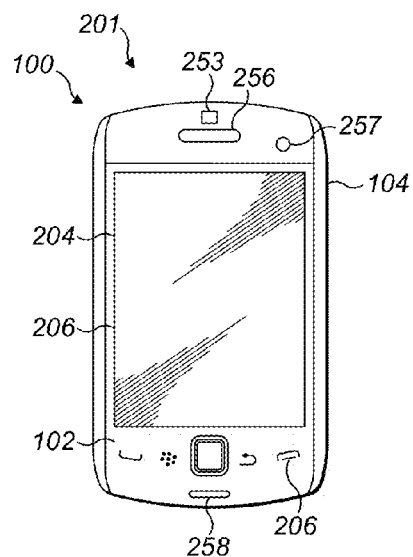
FIG. 2 is a plan view one electronic device usable by an end-user in some embodiments.

Referring now to FIG. 2, a front view of an electronic device 201 which in the depicted example of FIG. 2 is a communications device 100, such as a wireless, mobile, handheld and/or portable communications device, e.g. mobile phone or smartphone, is illustrated. The communications device 100 may offer advanced computing capability. For example, the communications device 100 may have the ability to run third party applications which are stored on the communications device. In the context of the claimed invention, the communications device 100 may be a first or second electronic device 201, or both.

The communications device 100 includes all of the components discussed above with reference to FIG. 1, or a subset of those components. The communications device 100 includes a housing 104 which houses at least some of the components discussed above with reference to FIG. 1.

In the depicted embodiment, the communications device includes a display 204, which may be a touchscreen which acts as an input interface 206. The display 204 is disposed within the communications device 100 so that it is viewable at a front side 102 of the communications device 100. That is, a viewable side of the display 204 is disposed on the front side 102 of the electronic device. In the embodiment illustrated, the display 204 is framed by the housing 104.

The communications device 100 also includes other input interfaces 206 such as one or more buttons, keys or navigational input mechanisms. In the embodiment illustrated, at least some of these additional input interfaces 206 are disposed for actuation at a front side 102 of the communications device.

The communications device may also include a speaker 256. In the embodiment illustrated, the communications device includes a single speaker 256 which is disposed vertically above the display 204 when the communications device 100 is held in a portrait orientation where its height is longer than its width. The speaker 256 may be disposed on the front face of the communications device 100.

While the communications device 100 of FIG. 2 includes a single speaker 256, in other embodiments, the communications device 100 may include a greater number of speakers 256. For example, in at least some embodiments, the communications device 100 may include a second speaker 256 which is disposed vertically below the display 204 when the communications device is held in a portrait orientation where its height is longer than its width (i.e. the orientation illustrated in FIG. 2).

The communications device 100 also includes a microphone 258. In the embodiment illustrated, the microphone 258 is vertically disposed below the display 204 when the communications device is held in the portrait orientation. The microphone 258 and at least one speaker 256 may be arranged so that the microphone is in close proximity to a user's mouth and the speaker 256 is in close proximity to a user's ear when the user holds the phone to their face to converse on the communications device.

The communications device 100 also includes a front facing camera 253 which may be located vertically above the display 204 when the communications device 100 is held in a portrait orientation where its height is longer than its width. The front facing camera 253 is located so that it may capture images of objects which are located in front of or surrounding the front side of the communications device 100.

The communications device 100 also includes an electromagnetic radiation source 257. The electromagnetic radiation source 257 is disposed on the front side 102 of the communications device 100. In this orientation, electromagnetic radiation which is produced by the electromagnetic radiation source 257 may be projected onto objects which are located in front of or surrounding the front side of the communications device 100. Such electromagnetic radiation (or the projection of electromagnetic radiation onto objects) may be captured on images detected by the camera 253.

Figure 3:
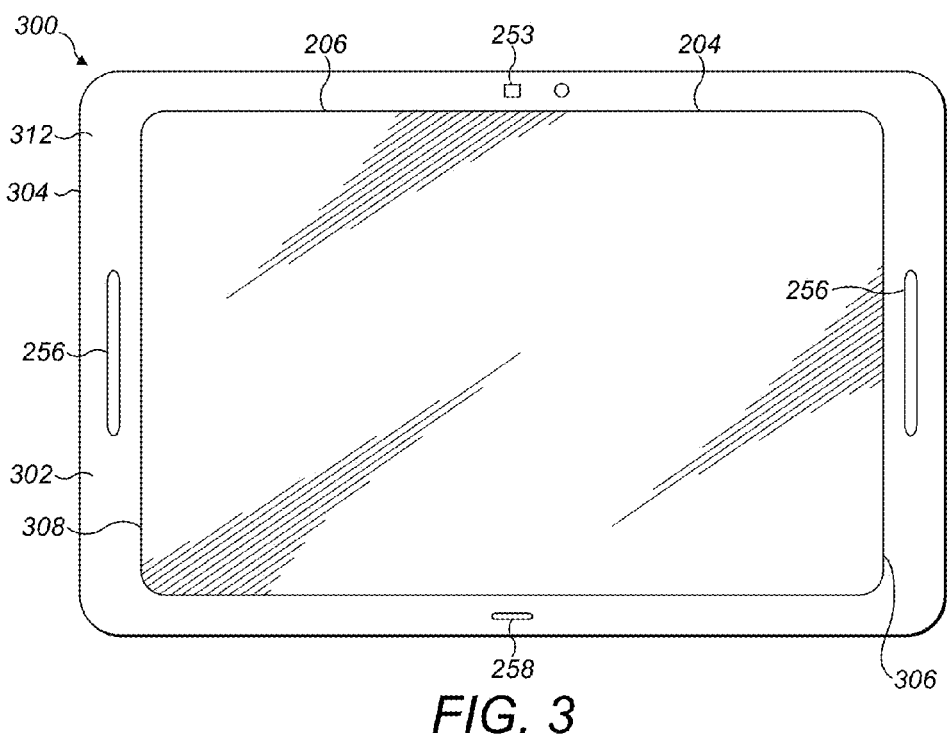
FIG. 3 is a side view of an external display which can be utilised with the electronic device in some embodiments.

Referring now to FIG. 3, a front view of a display device 300 comprising the display 204 is illustrated. The depicted display device 300 may be an external display device separate or remote from the electronic device 201 or built into the housing of the electronic device 201. The display device 300 may be in communication with the external video output port 254. The display device 300 may include a housing 304 which houses one or more of the components discussed above with reference to FIG. 1.

The display device 300 includes a display 204, which, as explained above, may include a touch-sensitive interface or overlap which acts as the input interface 206. The display 204 is disposed within the display device 300 so that it is viewable at a front side 302 of the display device 300. That is, a viewable side of the display 204 is disposed on the front side 302 of the display device 300. In the embodiment illustrated, the display 204 is framed within the housing 304 by frame 312.

The frame 312 can surround the display 204 and is the portion of the housing 304 which provides a border around the display 204. In at least some embodiments, the frame 312 is an active frame 312. That is, the frame has a touch-sensitive overlay which allows the display device 201 to detect a touch applied to the frame thus allowing the frame 312 to act as component of the input interface 206.

The display device 300 may optionally include a plurality of speakers 256. In the embodiment illustrated, the tablet includes two speakers 256. The two speakers 256 are disposed on opposing sides of the display 204. More particularly, when the display device 300 is positioned in a landscape orientation (such as the orientation illustrated in FIG. 3) where its width is longer than its height, one of the two speakers is disposed on a right side 306 of the display 204 and one of the speakers is disposed on the left side 308 of the display 204. Both speakers 256 may be disposed on the front side 302 of the display device 300.

The display device 300 may also optionally include a microphone 258. In the embodiment illustrated, the microphone 258 is vertically disposed below the display 204 when the display device is held in the landscape orientation illustrated in FIG. 3. The microphone 258 may be located in other locations in other embodiments.

The display device 300 may also include a front facing camera 253 which may be located vertically above the display 204 when the display device 300 is held in a landscape orientation (i.e. the orientation of FIG. 3). The front facing camera 253 may be located on the display device 300 so that it may capture images of objects which are located in front of or surrounding the front side of the display device 300.

The display device 300, which be a completely discrete and independent additional electronic device (similar or identical to electronic device 201) and contain the functionality of such a device completely independently from device 201. In this regard, the display device 300 may be being controlled by electronic device 201 so that the display 204 shows display data output by the device 201, separate from or in addition to display data generated internally by the device 300 acting as an additional electronic device. For example, the display device may be acting as a mirroring device for a display generated by device 201.

Figure 4:
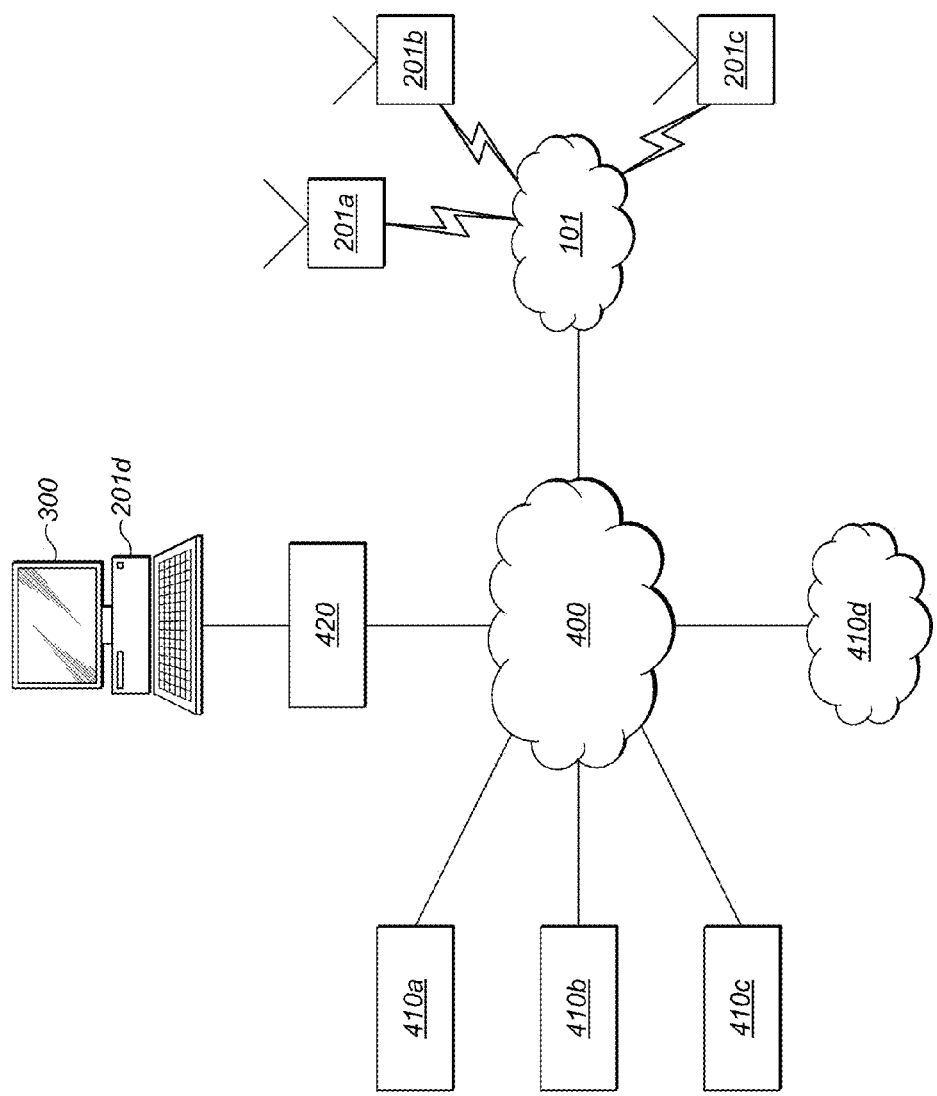
FIG. 4 is a schematic diagram of a system in which the aforementioned electronic device can be employed in some embodiments.

FIG. 4 shows a system of networked apparatus by which electronic communications can be sent and received using multiple electronic devices 201a, 201b, 201c. Referring to FIG. 4, electronic devices 201a, 201b and 201c are connected to wireless network 101 to perform voice and data communications. Wireless network 101 is also connected to the communications network 400, e.g. Internet. Electronic device 201d may be a computing device, which may be a personal computer, e.g. desktop, laptop or notebook computer, having one or more of the components and/or functionality of device 201 described above, and connected by a wired or wireless communication link to network 420, which is also connected to or forms part of the communications network 400. Electronic devices 201b and 201c may be computing or communication devices having one or more of the components and/ or functionality of device 201 described above. Electronic devices 201a, b, c, d may access the communications network 400 to perform data communications therewith and with each other.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers transmitting and receiving data, such as electronic messages to, from and/or between electronic devices 201a, 201b, 201c and 201d.

Other servers and services may of course be provided allowing users of electronic devices 201a, 201b, 201c and 201d to send and receive electronic communications or messages by, for example, Voice over IP phone calls, video IP calls, video chat, group video chat, blogs, file transfers, instant messaging, and feeds.

Wireless network 101 may also support electronic communications without using communications network 400. For example, a user of communications device 201b may use wireless network 101 to make telephony calls, video calls, send text messages, send multimedia messages, and send instant messages to communications device 201c, and to display application data on a display screen of the external display device 300, or control the display of application data.

The embodiment shown in FIG. 4 is intended to be non-limiting and additional network infrastructure may of course be provided, such as a Public Switched Telephone Network (not shown), which may be used, for example, to make telephony calls using one communication device 201a, 201b, 201c or 201d to another, or to a wired phone (not shown).

In order to explain certain example modes of operation, reference is made below to FIGS. 5A to 5E and FIG. 6. Reference is made a first electronic device 201a or 201d which may respond to events detected by the processor 240, such as the receipt of data, e.g. electronic messages, from one or more servers 410, or directly from a second electronic device 201b over network 101 or 400 through communications subsystem 211 or via direct communication established via, for example, subsystems 268 or port 252 and a second electronic device 201b. The processor 240 in electronic device 201a or 201d may comprise or be one or more processing circuits configured to perform the methods described herein, and the one or more processing circuits may comprise one or more discrete electronic processing components.

The event detected by the processor 240 may include one or more of: detection of receipt of an electronic message, such as an email, SMS, instant messenger notification; detection of a preset alarm indicative of a current or upcoming event; detection of a preset, stored or received current or upcoming calendar event; or any other alert or notification corresponding to application data stored or received within or by the device 201 and which may notified to a user of the device 201.

FIGS. 5A to 5E illustrate the display 204 of the electronic device 100 in various first to fourth configurations 501 (FIG. 5A), 502 (FIG. 5B), 503 (FIGS. 5C and 5D(i) and (ii)) and 504 (FIG. 5E) which may be dependent upon one or more different states of the processor 240, such as an operating state, which may also be or include a notification state. The operating state can be determined by input previously received via the input interface 206, which as explained above, may include a pointing device 550.

In a first configuration 501 (see FIG. 5A), the processor 240 is in a first operating state in which a notification of an event detected by the processor 240 is displayed on the display 204 as a display object 560. The input interface 206 can detect user input, e.g. by the pointing device 550 controlling the position of pointer 570 on the display 204, in a direction towards the display object 560. When such input is detected at a position X, either any input in a direction towards the display object 560 or a predefined amount of user input, e.g. continuous movement of the pointer under control of the pointing device 550 in a direction towards the display object 560 for a detected predefined duration of time, and/or discrete segments of movement in a direction towards the display object 560 within a set predefined duration of time, then the processor 240 places itself into a second operating state and the display 204 can be placed into a second configuration 502 (see FIG. 5B).

In the context of the present disclosure, detection via the input interface 206 of user input towards or in a direction towards the display object 560 may include detection of any user input across the display 204, e.g. of pointer 570 controlled by pointing device 550, or of a touch gesture in the case of touch-sensitive detection via input interface 206, which has at least a directional component which is in a direction (having a magnitude greater than zero, i.e. positive) towards the display object 560, which may include: in a direction towards any part of the display object 560; the border of the display object 560; and/or the geometric centre of the display object 560.

If, in the first operating state, no user input or insufficient user input in a direction towards the display object 560 is detected within a first predefined duration of time, then the display object 560 may be removed from the display 204 by the processor 240, or reduced or faded in appearance over time.

In the second configuration 502 (see FIG. 5B), the processor 240 is in the second operating state. In this second operating state, the processor 240 may adapt or redisplay the display object 260 as displayed in the first operating state, or maintain the display object 260 in its form from the first configuration 501, so that in either event, the display object 260 is not removed from the display 204 for at least a second predefined duration of time. If the display object 260 is modified by the processor as a result of being in the second operating state, then the modification may be such that the display object now includes an indication that the processor 240 is in the second operating state, i.e. user input towards the display object 260 has been detected, e.g. an icon indicating this state or colour within or of the display object 260 may be changed with respect to the first configuration 501.

In the second operating state, the input interface 206 can again detect user input, e.g. by the pointing device 550 controlling the position of pointer 570 on the display 204, in a direction towards the display object 560. When such input is detected, either any input in a direction towards the display object 560 or a predefined amount of user input, e.g. continuous movement of the pointer 570 under control of the pointing device 550 in a direction towards the display object 560 for the detected predefined duration of time, and/or discrete segments of movement in a direction towards the display object 560 within the set predefined duration of time, then the processor 240 maintains itself in the second operating state and the display 204 is kept in the second configuration 502. In this regard, the calculation of the time for comparison with the second predefined time duration may be reset to zero, such that so long as there is user input at a given time towards the display object 560, there is always at the given time the second predefined amount of time remaining before the display object starts to be or is completely removed from the display, or caused to be reduced in appearance or faded.

If, in the second operating state, no user input or insufficient user input in a direction towards the display object 560 is detected within the second predefined duration of time, then the display object 560 may be removed from the display 204 by the processor 240, or reduced or faded in appearance over time. The second predefined duration may equate to the first predefined duration.

If the current detected position of user input X is detected as having moved into or within a first predefined distance A1 of the display object (e.g. as calculated from: the border of the display object 560, the geometrical centre of the display object 560, or other characteristic or feature of the display object 560, when in the first or second configurations 501, 502), or user input is detected as having moved into or within a first predefined region A of the display 504 when in the first or second operating state, then the processor 240 places itself into a third operating state and the display 204 is placed into a third configuration 503 (see. FIGS. 5C and 5D(i) and (ii)).

In the third configuration 503 (see. FIGS. 5C and 5D(i) and (ii)), the processor 240 is in the third operating state. In this third operating state, the processor 240 adapts or reconfigures the display object 260 to be in a different form to that displayed in the first and/or second operating states. For the third configuration 503, the processor 240 causes the display object 560 to display different and/or additional information, e.g. additional information concerning the event, to that displayed when in the first and/or second configurations 501, 502.

In one example as depicted in FIG. 5D(i), if the display object 560 pertains to notification of an event which is receipt of an electronic message by the device 201a, 201d, then the additional information may include a preview of some or all of the content of the received message, e.g. the body of the message text, and/or time and/or date of receipt of the message (if not already displayed in the first or second configurations 501, 502). In the first and/or second configurations 501, 502, the display object may display more limited information pertaining to the message, e.g. information indicative only of the sender of the message, such as name and/or image associated with the sender, and/or time and/or date of receipt of the message.

In one example as depicted in FIG. 5D(ii), the display object 560 pertains to electronic messages stored on the device 201a, 201d, in which case the additional information may include a preview of some or all or any of the content of the received message, and correspond to, comprise or be indications of: some or all preceding messages in a conversation or from a given sender; all messages; unread messages, such as all unread messages present on the device; and information or an indications of new messages, such as all new messages received with a predefined time period, or since the additional information was previously viewed on the display 204. The aforementioned information may be viewable and/or accessible in the display object 560 in a scrollable list which can be scrolled through input received via the input interface 206.

In another example, if the display object 560 pertains to notification of an event which is warning of a current or upcoming calendar entry or alarm stored as application data in the device 201a, 201d, then the additional information may include a preview of some or all of the content of the calendar or alarm entry, e.g. the body of the message text, and/or location assigned to the calendar or alarm entry (if not already displayed in the first or second configurations 501, 502). In the first and/or second configurations 501, 502, the display object may display more limited information pertaining to the event or alarm, e.g. information indicative only of the subject or title of the calendar entry or alarm, and/or location assigned to the calendar entry or alarm.

In the third configuration 503 and third operating state, if the position X of user input, e.g. pointer 570 is controlled by pointing device 550, to move out of the first predetermined region A, or to be greater than the first predetermined distance A1, then the operating state may revert to one of the first or second operating states as defined by the user input detected by the input interface 206 and described above, and the display 204 will be adapted to be in the first or second configuration 501, 502.

If user input is detected into or within a second predefined region, e.g. a region defined by a second predefined distance B1 of the display object 560 when in the first, second or third operating states (e.g. as calculated from: the border of the display object 560, the geometrical centre of the display object 560, or other characteristic or feature of the display object 560), then the processor 240 places itself into a third operating state and the display 204 is placed into a fourth configuration 504 (see. FIG. 5E). The second predefined distance B1 may be different to the first predefined distance A1, or the second predefined region B which is different to the first predefined region A. The second predefined region B may equate to the region of the display 204 which is coincident with the display object 560, e.g. with its border, when in the first, second, third or fourth configurations. As shown in FIG. 5C, user input by the pointer 570 is into the second predefined region defined by the border of the display object 560 in the third configuration 503. Upon detection of such user input (e.g. position of pointer 570) when in the first, second or third operating states, the processor 240 places itself into the fourth operating state and the display 204 is placed into a fourth configuration 504 (see FIG. 5E).

In the fourth configuration 504, the processor 240 is in the fourth operating state. In this fourth operating state, the processor 240 adapts or reconfigures the display object 260 to be in a different form to that displayed in the first, second and/or third operating states, which may be in an expanded form (i.e. increased in size). For the fourth configuration 504, the processor 240 causes the display object 560 to display different and/or additional information to that displayed in the first, second and/or third configurations, e.g. additional information concerning the event, to that displayed when in the first, second and/or third configurations 501, 502.

For example, in the fourth configuration 504, the display object 560 may contain some or all of the text, body and/or subject of earlier messages received from and/or sent to the same sender of the message which gave rise to the event notification causing display of the display object 560 in the first, second and/or third configurations 501, 502, 503. In addition, or alternatively, in the fourth configuration 504, the display object 560 may contain one or more user input fields, e.g. text input fields pertaining to input of information relating to the event, or user input controls, e.g. user controllable buttons. The user input fields may comprise text input fields for changing data pertaining to the detected event, e.g. a reply text input field for replying to a message which gave rise to the event notification, or text edit fields for the time, date, location, subject and/or body of a calendar or alarm notification event. The user input controls may comprise one or more controls for: replying to or ignoring a message which gave rise to the event notification event; accepting, snoozing, cancelling, declining or making tentative a calendar or alarm notification event, or cancelling the event notification and display object completely by removing it from the display 204.

In the fourth configuration 504 and fourth operating state, if user input, e.g. pointer 570 is controlled by pointing device 550, to move out of the second predetermined region B, or to be greater than the second predetermined distance B1, then the operating state may revert to one of the first, second, third operating states as defined by the user input detected by the input interface 206 and described above, and the display 204 will be adapted to be in the corresponding first, second or third configurations 501, 502, 503.

In respect of the above disclosure, it will be appreciated that the first, second, third and fourth operating states can be referred to as "notification" states in respect of the display object being a notification, for example of an event detected by the processor 240. In addition, it will be appreciated that the first, second, third and fourth operating states can occur independently of the state which precedes them. Each of the first, second, third and fourth operating states can occur independently of any other of the first, second, third and fourth operating states following an initial operating state in which the display object, e.g. notification, is displayed on the display 204. The above disclosure and FIGS. 5A to 5E describe one exemplary embodiment in which the first, second, third and fourth operating states follow a preceding state in the order set out above. However, this need not necessarily be the case, and each of the second, third and fourth operating states may by the subsequent operating state which immediately follows the first initial operating state.

FIG. 6 is a flow chart depicting a method 600 performed by the processor 240 of a first electronic device 201a, 201d, as described in association with FIGS. 5A to 5E.

At block 601, the processor 240 causes the display object 501 to be displayed on a display, the notification initially being in the first operating state.

At block 602, the processor 240 detects user input and determines if the user input is being made in a direction towards the display object 501.

At block 603, if the user input is being made in a direction towards the display object 501, the processor 240 places the notification into the second operating state.

While the present application is primarily described in terms of devices and methods (e.g., electronic devices 201a, 201b, 201c and 201d), the devices may include components for performing at least some of the example aspects and features of the described methods, be it by way of hardware components (such as the memory 244, 246, 248 and/or the processor 240), software or any combination of the two, or in any other manner. Moreover, an article of manufacture for use with the apparatus, such as a pre-recorded storage device or other similar computer readable medium including program instructions recorded thereon may direct the apparatus to facilitate the practice of the described methods. It should be understood that such apparatus and articles of manufacture come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)). The computer readable medium may be a non-transitory computer readable medium.

It will be appreciated that the foregoing discussion relates to particular embodiments. However, in other embodiments, various aspects and examples may be combined.

The invention claimed is:

1. A method for interacting with a notification displayed on a display, comprising:
   displaying a notification on a display, the notification initially being in an initial notification state;
   detecting user input and determining if the user input is being made in a direction towards the notification; and
   if the user input is being made in a direction towards the notification, placing the notification into a subsequent notification state, the subsequent notification state being a state in which the size of the notification is expanded as the user input is made in the direction towards the notification;
   wherein an amount of expansion of the notification from the initial notification state to the subsequent notification state corresponds to a magnitude of user input which is in the direction towards the notification.

2. The method of claim 1, further comprising detecting an event, wherein the step of displaying the notification takes place in response to detection of the event.

3. The method of claim 2, wherein the event is one or more of: receipt of an electronic communication, such as an electronic message or call; notification of an alarm; and upcoming event notification.

4. The method of claim 1, wherein the initial notification state is a first notification state such that the notification is displayed on the display only for a first time period from when it was initially displayed.

5. The method of claim 4, wherein the subsequent notification state is a second notification state such that the notification is displayed on the display for a second time period from when the notification was placed in the second notification state.

6. The method of claim 5, wherein the second time period is infinite.

7. The method of claim 5, wherein the first time period is equal to the second time period.

8. The method of claim 4, wherein the first notification state is such that the notification is removed from the display by expiry of the first time period.

9. The method of claim 8, wherein when the notification is in the first notification state, it is displayed in such a way that it fades over time, and wherein when the notification enters into the subsequent notification state, the notification becomes unfaded.

10. The method of claim 9, wherein in the subsequent notification state, the notification becomes less faded if user input continues in a direction towards the notification.

11. The method of claim 1, wherein the user input is received via an input interface which provides a current input position on the display.

12. The method of claim 11, wherein the step of determining if the user input is being made in a direction towards the notification comprises determining the current input position on the display and comparing it with a previously received current input position.

13. The method of claim 1, further comprising determining if the current input position is within a first predefined loci of input positions, and, if so, placing the notification in the subsequent notification state which is a third notification state, wherein the third notification state is such that the notification is displayed in the display with additional display elements to those displayed within the notification when the notification is in its initial notification state.

14. The method of claim 13, wherein the notification is displayed in an expanded form in the display when in its third notification state with respect to the display of the notification when in its first notification state.

15. The method of claim 13, wherein the first predefined loci of input positions is defined by input positions which are all within a predefined distance from the notification.

16. The method of claim 15, wherein the first predefined loci of input positions does not include input positions at locations in the display where the notification is being displayed.

17. The method of claim 13, wherein the first predefined loci of input positions is defined by input positions which overlap with locations in the display where the notification is being displayed.

18. The method of claim 13, wherein the notification is placed only its third notification state when additionally an input signal from the input interface is detected.

19. The method of claim 13, further comprising determining if the current input position is within a second predefined loci of input positions, and, if so, placing the notification in a fourth notification state, wherein the fourth notification state is such that the notification is displayed in the display with additional display elements to those displayed within the notification when the notification is in its third notification state.

20. The method of claim 19, wherein the second predefined loci of input positions is defined by input positions which overlap with locations in the display where the notification is being displayed.

21. The method of claim 19, wherein the notification is placed only its fourth notification state when additionally an input signal from the input interface is detected.

22. The method of claim 13, wherein the additional display elements comprise one or more of: a message reply entry field; a message preview; a message body; a message sent or received time and/or date; a message reply control element; a message forward control element; a message delete control element; some or all preceding messages in a conversation; information or indications of some or all preceding messages in a conversation or from a given sender; information or an indications of unread messages, such as all unread messages; information or an indications of new messages, such as all new messages; a calendar entry preview; a calendar entry body; a calendar entry accept control element; a calendar entry reject control element; and a calendar entry tentative control element; a calendar entry location field; and a calendar entry date and/or time.

23. The method claim 22, wherein the notification is displayed in its initial notification state as a notification comprising one or more of: a message sender name; a message sender image; a message subject; a message preview; information or indications of some or all preceding messages in a conversation or from a given sender; information or an indications of unread messages, such as all unread messages; information or an indications of new messages, such as all new messages; a calendar entry sender; a calendar entry sender image; a calendar entry preview; a calendar entry subject; a calendar entry date and/or time; and a calendar entry location field.

24. The method of claim 1, wherein the size of the notification is decreased as user input is made in a direction away from the notification, following a preceding expansion in the size of the notification.

25. The method of claim 24, wherein the amount of decrease in size of the notification corresponds to the amount of user input which is away from the notification.

26. An electronic device, comprising:
a display configured to display a notification, the notification initially being in an initial notification state;
an input interface configured to detect user input; and
processing circuitry configured to determine if the user input is being made in a direction towards the notification, and, if the user input is being made in a direction towards the notification, place the notification into a subsequent notification state, the subsequent notification state being a state in which the size of the notification is expanded as the user input is made in the direction towards the notification;
wherein an amount of expansion of the notification from the initial notification state to the subsequent notification state corresponds to a magnitude of user input which is in the direction towards the notification.

27. The electronic device of claim 26, wherein the processing circuitry is configured to detect an event, wherein the displaying the notification takes place in response to detection of the event.

28. The electronic device of claim 26, wherein the event is one or more of: receipt of an electronic communication, such as an electronic message or call; notification of an alarm; and upcoming event notification.

29. The electronic device of claim 26, wherein the initial notification state is a first notification state such that the notification is displayed on the display only for a first time period from when it was initially displayed.

30. The electronic device of claim 29, wherein the subsequent notification state is a second notification state such that the notification is displayed on the display for a second time period from when the notification was placed in the second notification state.

31. The electronic device of claim 30, wherein the second time period is infinite.

32. The electronic device of claim 30, wherein the first time period is equal to the second time period.

33. The electronic device of claim 29, wherein the first notification state is such that the notification is removed from the display by expiry of the first time period.

34. The electronic device of claim 26, wherein the user input is received via an input interface which provides a current input position on the display.

35. The electronic device of claim 34, wherein the step of determining if the user input is being made in a direction towards the notification comprises determining the current input position on the display and comparing it with a previously received current input position.

36. The electronic device of claim 26, comprising processing circuitry configured to determine if the current input position is within a first predefined loci of input positions, and, if so, place the notification in the subsequent notification state which is a third notification state, wherein the third notification state is such that the notification is displayed in the display with additional display elements to those displayed within the notification when the notification is in its initial notification state.

37. The electronic device of claim 36, wherein the notification is displayed in an expanded form in the display when in its third notification state with respect to the display of the notification when in its first notification state.

38. The electronic device of claim 36, wherein the first predefined loci of input positions is defined by input positions which are all within a predefined distance from the notification.

39. The electronic device of claim 36, wherein the processing circuitry is configured to determine if the current input position is within a second predefined loci of input positions, and, if so, place the notification in a fourth notification state, wherein the fourth notification state is such that the notification is displayed in the display with additional display elements to those displayed within the notification when the notification is in its third notification state.

40. The electronic device of claim 39, wherein the second predefined loci of input positions is defined by input positions which overlap with locations in the display where the notification is being displayed.

41. The electronic device of claim 39, wherein the notification is placed only its fourth notification state when additionally an input signal from the input interface is detected by the processing circuitry.

42. The electronic device of claim 36, wherein the additional display elements comprise one or more of: a message reply entry field; a message preview; a message body; a message sent or received time and/or date; a message reply control element; a message forward control element; a message delete control element; information or indications of some or all preceding messages in a conversation or from a given sender; information or an indications of unread messages, such as all unread messages; information or an indications of new messages, such as all new messages; a calendar entry preview; a calendar entry body; a calendar entry accept control element; a calendar entry reject control element; and a calendar entry tentative control element; a calendar entry location field; and a calendar entry date and/or time.

43. The electronic device of claim 26, wherein the notification is displayed in its initial notification state as a notification comprising one or more of: a message sender name; a message sender image; a message subject; information or indications of some or all preceding messages in a conversation or from a given sender; information or an indications of unread messages, such as all unread messages; information or an indications of new messages, such as all new messages; a message preview; a calendar entry sender; a calendar entry sender image; a calendar entry preview; a calendar entry subject; a calendar entry date and/or time; and a calendar entry location field.

44. A non-transitory computer readable medium comprising computer executable instructions which, when executed by processing circuitry, cause the processing circuitry to:
  display a notification on a display, the notification initially being in an initial notification state;
  detect user input and determine if the user input is being made in a direction towards the notification; and
  if the user input is being made in a direction towards the notification, place the notification into a subsequent notification state, the subsequent notification state being a state in which the size of the notification is expanded as the user input is made in the direction towards the notification;
  wherein an amount of expansion of the notification from the initial notification state to the subsequent notification state corresponds to a magnitude of user input which is in the direction towards the notification.

* * * * *